(12) United States Patent
Maniktala (10) Patent No.: US 8,301,922 B2
(45) Date of Patent: Oct. 30, 2012

(54) SYSTEM AND METHOD FOR POLICING BAD POWERED DEVICES IN POWER OVER ETHERNET

(75) Inventor: Sanjaya Maniktala, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 462 days.

(21) Appl. No.: 12/576,886

(22) Filed: Oct. 9, 2009

(65) Prior Publication Data

US 2011/0029790 A1 Feb. 3, 2011

Related U.S. Application Data

(60) Provisional application No. 61/230,142, filed on Jul. 31, 2009.

(51) Int. Cl.
*G06F 1/28* (2006.01)

(52) U.S. Cl. ........... 713/310; 713/340; 307/29; 370/252
(58) Field of Classification Search ............. 713/310, 713/340; 370/252; 307/29
See application file for complete search history.

(56) References Cited

U.S. PATENT DOCUMENTS

| | | | |
|---|---|---|---|
| 6,614,806 B1 * | 9/2003 | Nanni ............................ 370/468 |
| 7,583,976 B2 * | 9/2009 | Batra et al. .................... 455/522 |
| 7,613,936 B2 * | 11/2009 | Stineman et al. ............. 713/300 |

* cited by examiner

*Primary Examiner* — Thuan Du
(74) *Attorney, Agent, or Firm* — Duane S. Kobayashi (57) ABSTRACT

A system and method for policing bad powered devices in power over Ethernet. Degradation of components within powered devices can lead to noise and ripple that exceed specified thresholds. This noise and ripple can adversely impact the operation of the power sourcing equipment. A noise detector implemented in the power sourcing equipment can detect the presence of such noise and ripple and modify the application of power to the particular port.

20 Claims, 6 Drawing Sheets

SYSTEM AND METHOD FOR POLICING BAD POWERED DEVICES IN POWER OVER ETHERNET

This application claims priority to provisional application No. 61/230,142, filed Jul. 31, 2009, which is incorporated herein by reference in its entirety.

BACKGROUND

1. Field of the Invention

The present invention relates generally to power over Ethernet (PoE) and, more particularly, to a system and method for policing bad powered devices in PoE.

2. Introduction

In a PoE application such as that described in the IEEE 802.3af and 802.3 at specifications, a power sourcing equipment (PSE) can deliver power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.3 at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

In the PoE process, a valid device detection is first performed. This detection process identifies whether or not a PSE is connected to a valid PD to ensure that power is not applied to non-PoE capable devices. After a valid PD is discovered, the PSE can optionally perform a power classification. In a conventional 802.3af allocation, each PD would initially be assigned a 15.4 W power classification after a Layer 1 discovery process. An optional classification process could then reclassify the PD to a lower power level. In more complex PoE schemes, a Layer 2 classification engine can be used to reclassify the PD. Layer 2 classification processes can be included in PoE systems such as 802.3af, 802.3 at or proprietary schemes.

PSEs are generally designed to manage a set of subscribing PDs. These PDs can be designed by various manufacturers and can be qualified based on standards of operational performance indicated by a PoE specification. While this qualification ensures that a PD can interoperate with a PSE from another manufacturer, it may not accurately reflect the potential degradation of PD performance over time due to aging of PD components. This degradation in PD performance can have a significant impact on PSE operation. What is needed therefore is a mechanism that enables a PSE to monitor and police PDs to determine when a PD's performance has degraded beyond a certain threshold.

SUMMARY

A system and method for policing bad powered devices in Power over Ethernet, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
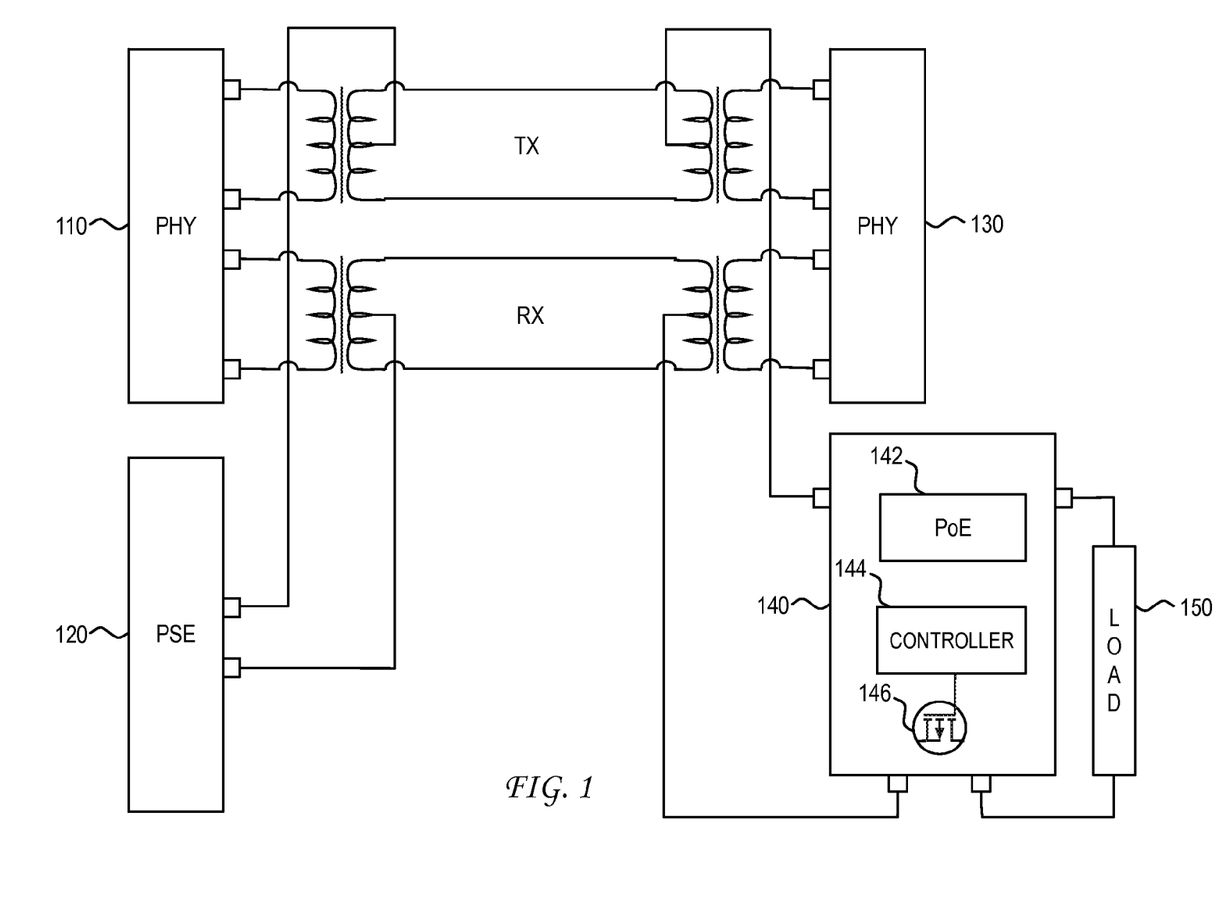
FIG. 1 illustrates an embodiment of a PoE system.

In an enterprise environment, a PoE system can be used to power a network of PDs. FIG. 1 illustrates an example of such a PoE system. As illustrated, the PoE system includes PSE 120 that transmits power to PD 140 over two wire pairs. Power delivered by PSE 120 to PD 140 is provided through the application of a voltage across the center taps of a first transformer that is coupled to a transmit (TX) wire pair and a second transformer that is coupled to a receive (RX) wire pair carried within an Ethernet cable. In general, the TX/RX pairs can be found in, but not limited to structured cabling.

The two TX and RX pairs enable data communication between Ethernet PHYs 110 and 130 in accordance with 10BASE-T, 100BASE-TX, 1000BASE-T, 10GBASE-T and/or any other Layer 2 PHY technology. Here, it should be noted that PoE does not require the presence of a PHY.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3 at (PoE Plus), legacy PoE transmission, or any other type of PoE transmission. PD 140 also includes controller 144 (e.g., pulse width modulation (PWM) DC:DC controller) that controls power transistor (e.g., FET) 146, which in turn provides constant power to load 150.

Figure 2:
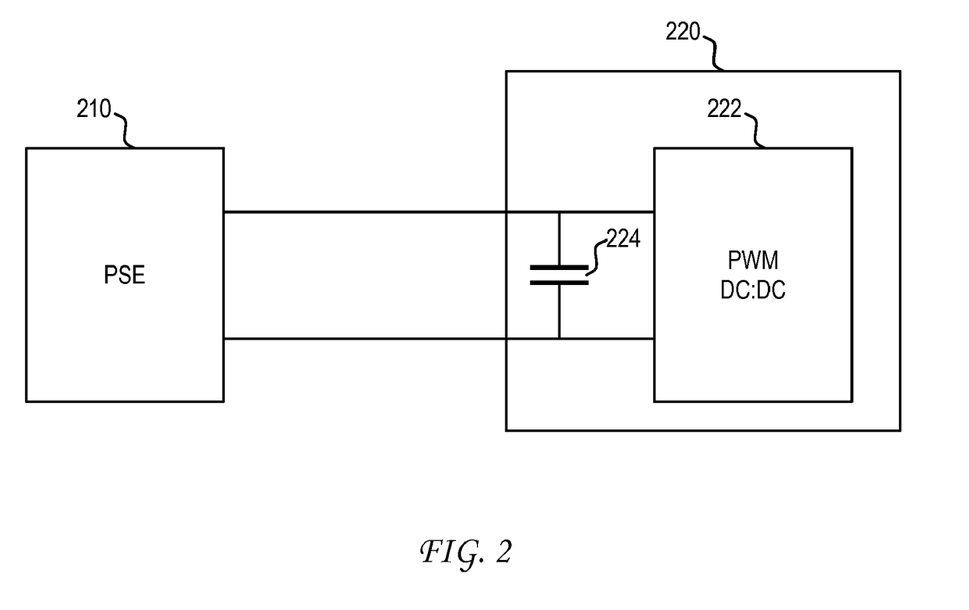
FIG. 2 illustrates a connection between a PSE and PD.

FIG. 2 provides a simplified illustration of a connection (without showing the transformers) between a PSE and PD. As illustrated, PSE 210 provides power to a controller such as PWM DC:DC controller 222 within PD 220 via decoupling capacitor 224. In a conventional implementation, decoupling capacitor 224 can be embodied as a 100 µF. aluminum electrolytic capacitor.

In IEEE 802.3af and IEEE 802.3 at, the PD power supply limits are specified as follows:

| | |
|---|---|
| Ripple and Noise, <500 Hz | 0.5 $V_{pp}$ |
| Ripple and Noise, 500 Hz to 150 kHz | 0.2 $V_{pp}$ |
| Ripple and Noise, 150 kHz to 500 kHz | 0.15 $V_{pp}$ |
| Ripple and Noise, 500 kHz to 1 MHz | 0.1 $V_{pp}$ |

This requirement is identical to the power feeding ripple and noise requirement that is specified for the PSE.

In the present invention, it is recognized that one of the issues of concern is the degradation of the performance of the PD, which can lead to electromagnetic interference (EMI) pollution via radiation from the cables. One of the potential culprits is the aging of decoupling capacitor 224.

A typical aluminum electrolytic capacitor is allowed by many PD vendors to have an equivalent series resistance (ESR) that can increase over three times from its initial value before the aluminum electrolytic capacitor is considered a wear-out failure. This wear-out failure of the aluminum electrolytic capacitor can determine the useful life of the entire PD itself.

More specifically, the increase in ESR of decoupling capacitor 224 can lead to a high voltage ripple being produced by PWM DC:DC controller 222 of PD 220 onto the cable. In one example, PWM DC:DC controller 222 can have a switching frequency of 100 or 125 kHz. This switching frequency can produce a high voltage ripple at a sub-harmonic or harmonic frequency. For example, a switching frequency of 125 kHz by PWM DC:DC controller 222 can produce a high voltage ripple at a sub-harmonic frequency of 62.5 kHz. The size of the voltage ripple would be greatly dependent on the ESR of decoupling capacitor 224.

Figure 3:
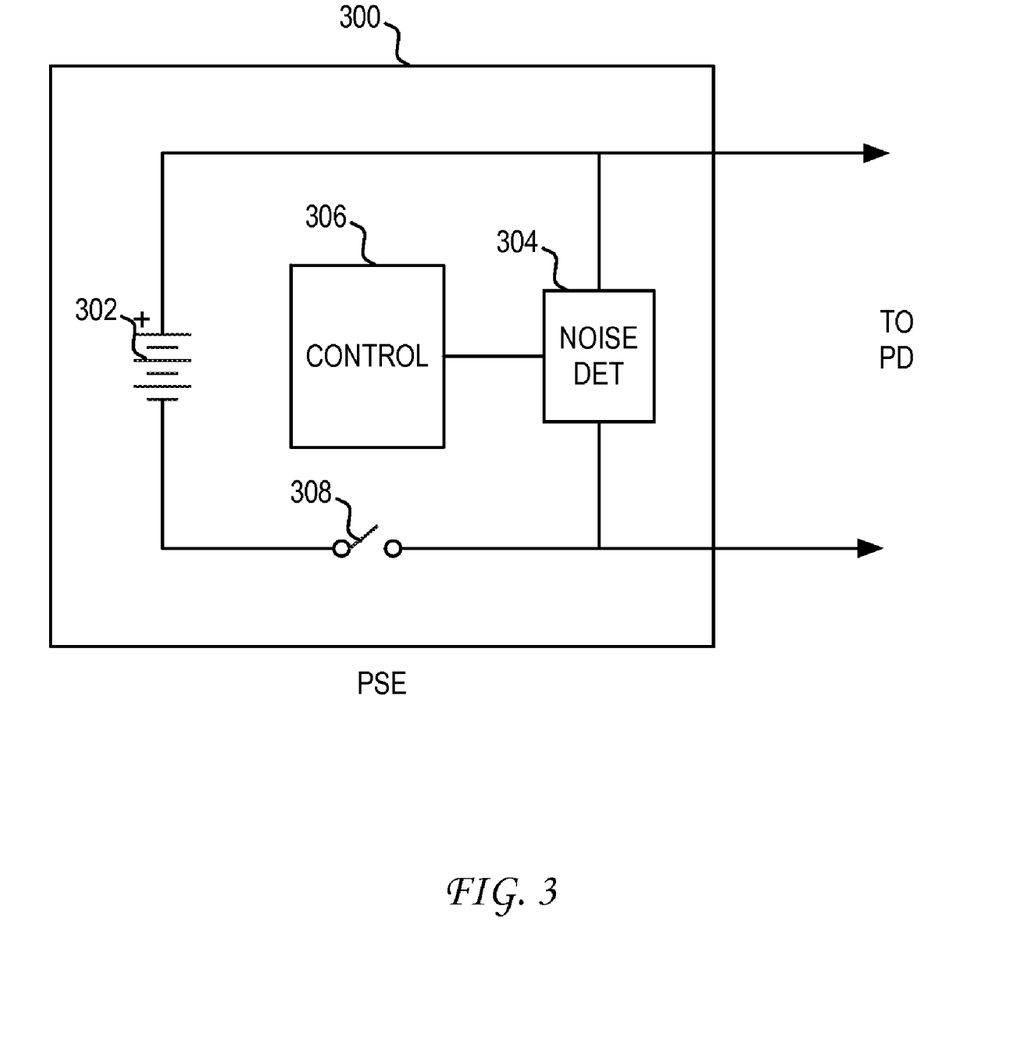
FIG. 3 illustrates a PSE according to the present invention.

It is a feature of the present invention that the high voltage ripple produced by the PD can be detected by the PSE. FIG. 3 illustrates an embodiment of such a detection mechanism in the PSE. As illustrated, PSE 300 includes power supply 302, which is designed to provide power to a PD via a connected cable. Typically, the power output of PSE 300 is very quiet. Accordingly, the noise and ripple generated by PSE 300 is unlikely to affect the proper functioning of the PD. The noise and ripple generated by the PD, on the other hand, is highly variable due to the potential ESR changes of the decoupling capacitor at the input of the PD controller. Notwithstanding this fact, the ripple and noise requirements that are imposed on the PD are identical to the ripple and noise requirements that are imposed on the PSE.

The noise and ripple generated by the PD can significantly affect the functioning of the PSE. For this reason, PSE 300 includes noise detector 304, which is coupled to the cable that delivers power to the PD. Noise detector 304 is generally designed to detect a voltage ripple generated by the PD. In one embodiment, noise detector 304 performs a voltage ripple measurement. As the voltage measurement can be dependent on the particular point of measurement, in an alternative embodiment, noise detector 304 performs a current ripple measurement. This current ripple measurement is advantageous in that the current ripple measurement can be performed anywhere on the cable.

In general, the detection of a ripple that exceeds the imposed requirement can lead to the modification of power that is applied to the PD. As illustrated in FIG. 3, this detection can lead to the cutting off of power to the PD using switch 308 that is under the control of controller module 306.

Figure 4:
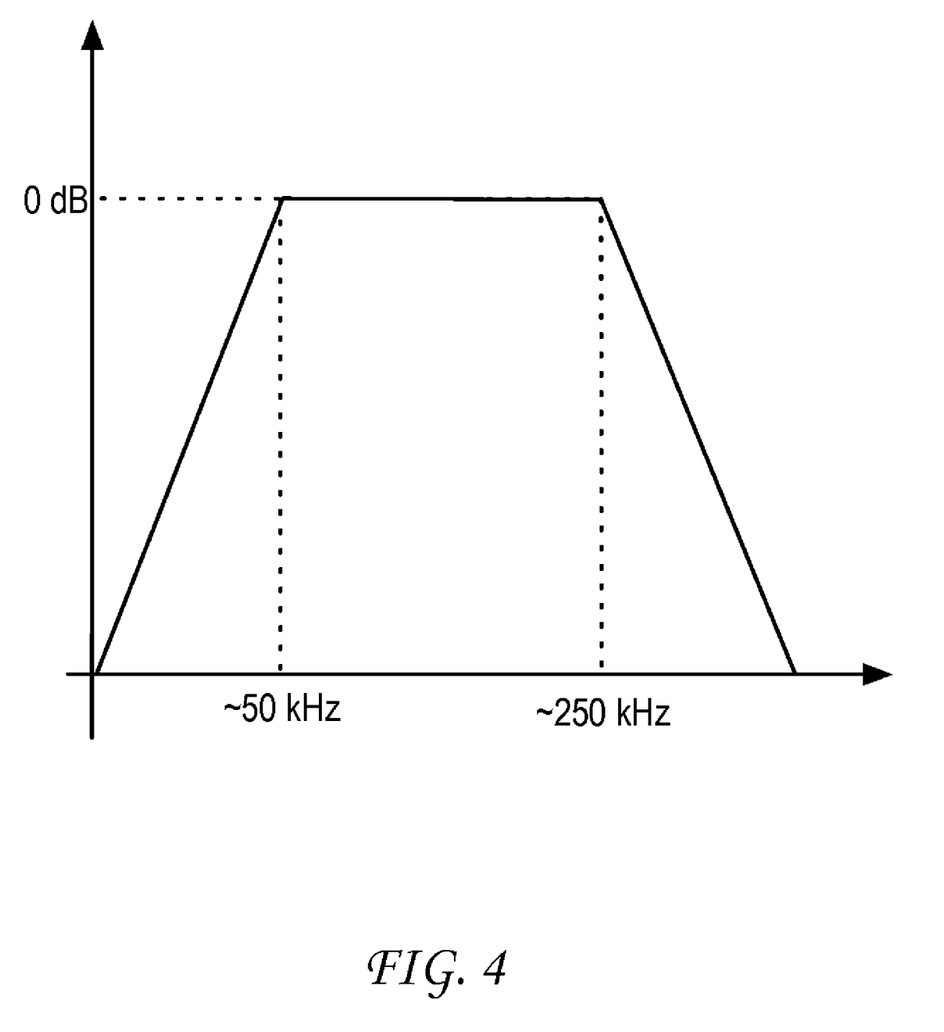
FIG. 4 illustrates a band-pass filter implemented by a noise detector in the PSE.

As noted, the frequency of the voltage ripple can be located on a sub-harmonic or harmonic of the switching frequency of the PWM DC:DC controller. Accordingly, in one embodiment, noise detector 304 is further designed to implement a band-pass filter such as that illustrated in FIG. 4 to capture the target frequency range of detection. The example band-pass filter of FIG. 4 is generally designed to capture the ripple at sub-harmonic or harmonic frequencies. As would be appreciated, the particular design of the filtering implemented by the noise detector would be implementation dependent.

Figure 5:
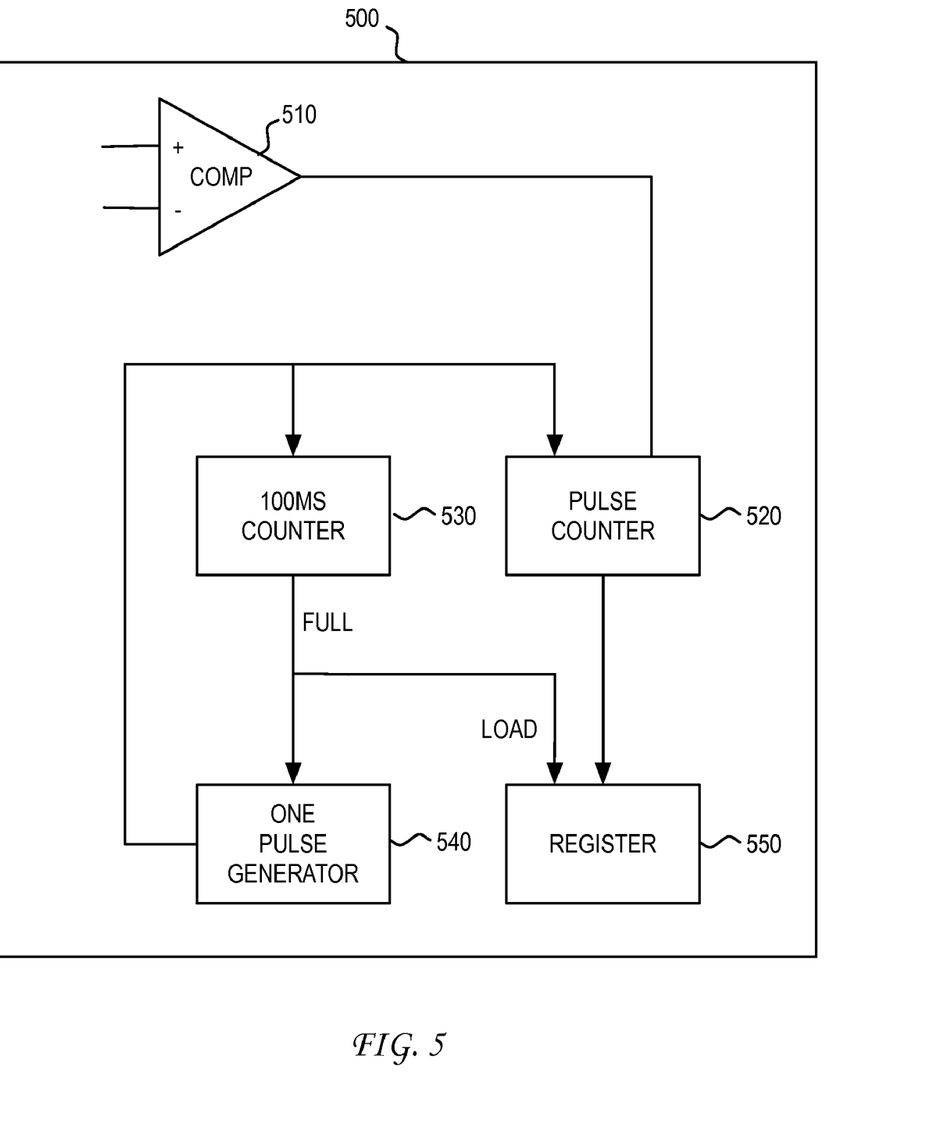
FIG. 5 illustrates an example of a noise detector.

FIG. 5 illustrates an embodiment of a detection mechanism implemented by the noise detector in the PSE. As illustrates, noise detector 500 includes comparator 510 that is operative to compare an input value to a threshold value. The result of comparator 510 is used as an input to pulse counter 520. Pulse counter 520 is designed to count the number of times the input value exceeds the threshold value during a measurement period (e.g., 100 ms) defined by counter 530. A full value output by counter 530 is provided to one pulse generator 540, which then outputs a reset signal to counters 520 and 530. The full value output by counter 530 is also used as a load signal for register 550 to load the value of pulse counter 520. The resulting value of pulse counter 520 provides an indication not only of a presence of a ripple that exceeds the threshold value, but also the number of times of such an occurrence within the measurement period. The value of register 550 will therefore provide an indication of the frequency of such a ripple signal (e.g., counter value of 25000 over 100 ms measurement period indicates a frequency of 25 kHz). An advantage of an implementation such as that illustrated in FIG. 5 is that it enables the creation of a detailed EMI profile up to a certain frequency.

Figure 6:
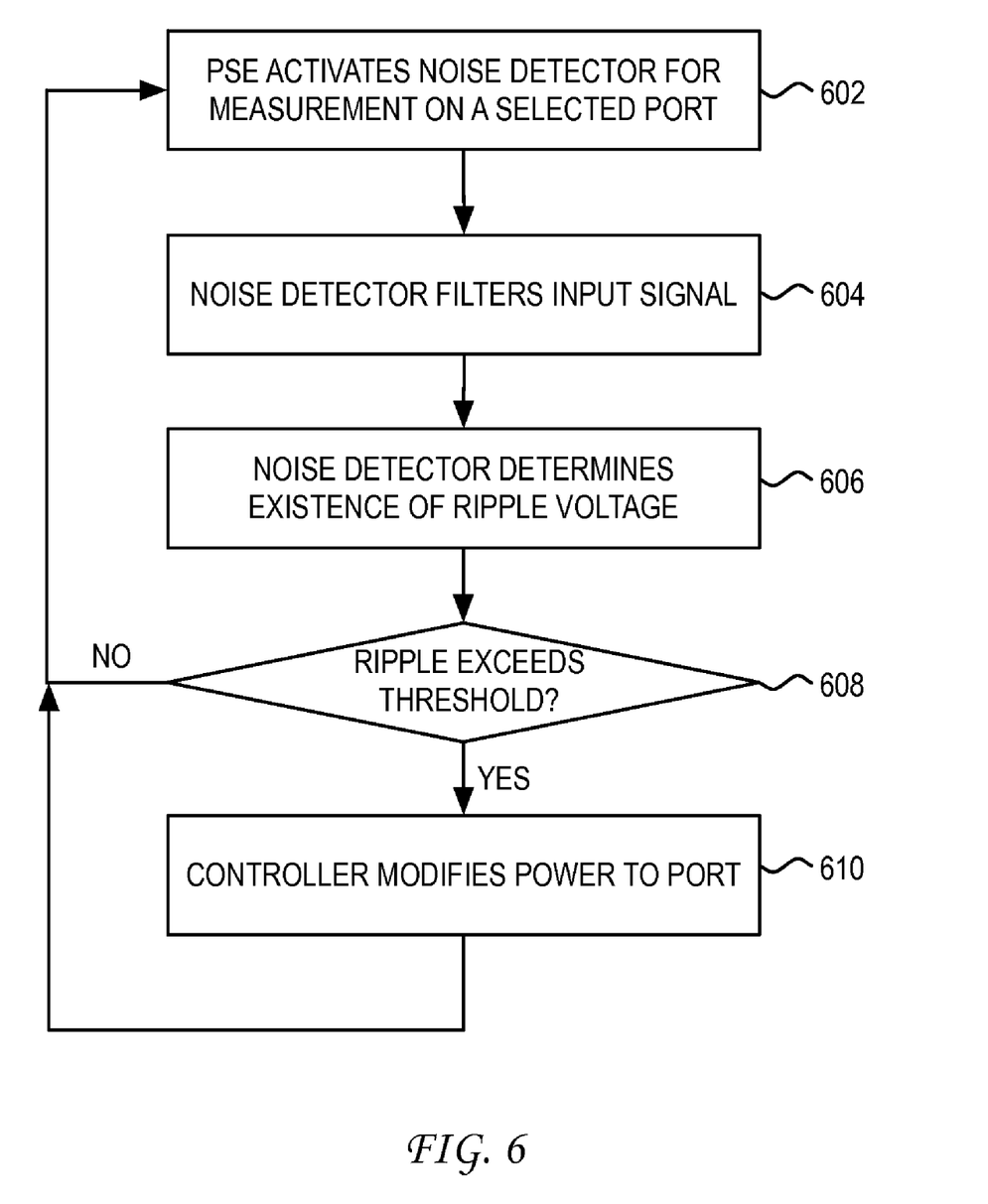
FIG. 6 illustrates a flowchart of a process of the present invention.

Having described an example implementation of a noise detection mechanism within a PSE, reference is now made to the flowchart of FIG. 6 to illustrate further features of the present invention. As illustrated, the process begins at step 602, where the PSE activates the noise detector for measurement on a selected port. In one embodiment, the noise detector can be activated to detect in a sequential manner the presence of a ripple signal on a plurality of ports that are connected to a previously detected PD. As would be appreciated, the noise detector can be designed to be turned on for a window of time that is sufficient to detect the presence of a ripple signal in a reliable manner. This window of time can be dependent on the quality and accuracy of the components used in the noise detector itself.

At step 604, the noise detector would filter the input signal to determine the presence of a ripple signal in a given frequency range. This frequency range can be designed to cover the expected variations in switching frequency of the controllers of various PD manufacturers to which the PSE can be connected. As would be appreciated, the particular frequency range chosen would be implementation dependent.

At step 606, the noise detector would determine whether a ripple voltage exists on the cable on the selected port. As noted, the ripple voltage determination can be based on various voltage or current measurements. Next, at step 608, it is determined whether the detected ripple exceeds the ripple threshold. In one embodiment, the threshold is contained as part of EMI profile that covers a range of thresholds for a corresponding plurality of frequency ranges. Additionally, in one embodiment, multiple thresholds for a single frequency range can be used to enable detection of a degradation of performance by the PD prior to reaching a state of failure.

If, at step 608, it is determined that the ripple does not exceed the threshold, then the process continues to step 602 where another port can be selected for analysis. If, on the other hand, at step 608, it is determined that the ripple does exceed the threshold, then the process continues to step 610 where a controller in the PSE can modify the power delivered to the port under analysis. In one example, the controller can choose to cut off all power to that port. In another example, the controller can choose to lower the power level delivered to that port, thereby preserving some level of functionality on that PD prior to shutting down all power being delivered.

It should be noted that the principles of the present invention can be applied to various networks that use standard or non-standard (e.g., 2.5 G, 5 G, etc.) link rates, as well as future link rates (e.g., 40 G, 100 G, etc.). Also, the principles of the present invention can be applied to various single-pair, two-pair and four-pair PoE applications, or more generally, a power delivery application using at least a pair of conductors.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A remote powering method in a power sourcing equipment, comprising:
   detecting a presence of a valid powered device that is capable of receiving power via a port, said powered device being coupled to said port via a cable;
   after completion of said detection of said power device applying power to said port at a first power level for powered operation of said powered device;
   determining, during said application of said power at said first power level whether a noise ripple level represented by a periodic variation of a voltage level on said cable exceeds a threshold level; and
   modifying an application of power to said port to a second power level if said determination indicates that said noise ripple level on said cable exceeds said threshold level.

2. The method of claim 1, wherein said determining comprises determining a noise ripple level in a frequency range.

3. The method of claim 2, wherein said determining comprises determining with a band-pass filter.

4. The method of claim 2, wherein said determining comprises determining a noise ripple level in a frequency range based on harmonics and/or sub-harmonics of a frequency of operation of a power converter in said powered device.

5. The method of claim 2, wherein said determining comprises determining whether a current ripple level exceeds said threshold level.

6. The method of claim 2, wherein said determining comprises determining whether a voltage ripple level exceeds said threshold level.

7. The method of claim 6, wherein said determining comprises determining whether a voltage ripple level exceeds a threshold level defined by IEEE 802.3af.

8. The method of claim 1, wherein said modifying comprises modifying an application of power to said port to a zero power level.

9. The method of claim 1, wherein said determining comprises determining whether a noise ripple level on said cable exceeds a threshold level defined by a profile.

10. A power sourcing equipment system, comprising:
    a power supply for delivering power to a port coupled to a valid powered device via a cable, wherein a validity of said powered device is determined using a detection process;
    a detector that determines, during a delivery of power by said power supply to said port, whether a noise ripple level represented by a periodic variation of a voltage level on said cable exceeds a threshold level; and
    a controller that modifies said delivery of power to said port based on said determination.

11. The system of claim 10, wherein said detector identifies a noise ripple level in a frequency range.

12. The system of claim 11, wherein said detector includes a band-pass filter.

13. The system of claim 11, wherein said detector identifies a noise ripple level in a frequency range based on harmonics and/or sub-harmonics of a frequency of operation of a power converter in said powered device.

14. The system of claim 11, wherein said detector determines whether a current ripple level exceeds said threshold level.

15. The system of claim 11, wherein said detector determines whether a voltage ripple level exceeds said threshold level.

16. The system of claim 15, wherein said threshold level is defined by IEEE 802.3af.

17. The system of claim 10, wherein said controller shuts down said delivery of power to said port.

18. The system of claim 10, wherein said cable is an Ethernet cable.

19. The system of claim 10, wherein said threshold level is defined in a profile.

20. A power sourcing equipment system that is configured to deliver power to a valid powered device via a cable, wherein a validity of said powered device is determined using a detection process by said power sourcing equipment system, comprising:
    a detector that determines, while said power sourcing equipment system delivers power to said valid powered device via said cable, whether a noise ripple level represented by a periodic variation of a voltage level on said cable exceeds a threshold level; and
    a controller that modifies a delivery of power to said valid powered device based on said determination.

* * * * *

UNITED STATES PATENT AND TRADEMARK OFFICE
CERTIFICATE OF CORRECTION

| | | |
|---|---|---|
| PATENT NO. | : 8,301,922 B2 | Page 1 of 1 |
| APPLICATION NO. | : 12/576886 | |
| DATED | : October 30, 2012 | |
| INVENTOR(S) | : Sanjaya Maniktala | |

It is certified that error appears in the above-identified patent and that said Letters Patent is hereby corrected as shown below:

Col. 5, line 25, replace "power" with --powered--.

Signed and Sealed this
Eighteenth Day of December, 2012

David J. Kappos
*Director of the United States Patent and Trademark Office*